United States Patent
Wang et al.

(10) Patent No.: US 8,199,498 B2
(45) Date of Patent: Jun. 12, 2012

(54) INFORMATION HANDLING SYSTEM SUPPORT MEMBER

(75) Inventors: Po-Tien Wang, Taipei (TW); Iou-Ren Su, Keelung (TW); Tung Yu Chien, Panchiao (TW)

(73) Assignee: Dell Products L.P., Round Rock, TX (US)

( * ) Notice: Subject to any disclaimer, the term of this patent is extended or adjusted under 35 U.S.C. 154(b) by 296 days.

(21) Appl. No.: 12/552,112

(22) Filed: Sep. 1, 2009

(65) Prior Publication Data

US 2011/0051339 A1    Mar. 3, 2011

(51) Int. Cl.
*G06F 1/16* (2006.01)

(52) U.S. Cl. ............... 361/679.59; 361/679.26; 361/724; 248/638; 248/688; 312/223.1; 312/223.2

(58) Field of Classification Search ............... 361/679.59
See application file for complete search history.

(56) References Cited

U.S. PATENT DOCUMENTS

| | | | |
|---|---|---|---|
| 4,742,478 A | | 5/1988 | Nigro, Jr. et al. |
| 4,767,105 A | * | 8/1988 | Caspers ......................... 267/140 |
| 4,846,428 A | * | 7/1989 | Johannes .................... 248/188.8 |
| 5,153,052 A | * | 10/1992 | Tanaka et al. ................ 428/212 |
| 5,818,690 A | | 10/1998 | Spencer |
| 6,155,530 A | * | 12/2000 | Borgen ......................... 248/638 |
| 6,498,719 B1 | * | 12/2002 | Bridges .................... 361/679.34 |
| 6,714,405 B2 | * | 3/2004 | Jitsukawa ................ 361/679.36 |
| 6,979,778 B2 | * | 12/2005 | Xiong et al. ..................... 174/50 |
| 7,450,373 B2 | | 11/2008 | Lee et al. |
| 7,697,283 B2 | * | 4/2010 | Mathew et al. .......... 361/679.59 |
| 7,990,703 B2 | * | 8/2011 | Tang ........................ 361/679.59 |
| 2003/0179543 A1 | * | 9/2003 | Sri-Jayantha et al. ........ 361/683 |
| 2007/0177342 A1 | | 8/2007 | Mundt et al. |
| 2008/0253081 A1 | * | 10/2008 | Tracy et al. .................... 361/687 |
| 2009/0175001 A1 | * | 7/2009 | Mathew et al. .......... 361/679.59 |
| 2010/0149752 A1 | * | 6/2010 | Lian ........................ 361/679.59 |

* cited by examiner

*Primary Examiner* — Anthony Q Edwards
(74) *Attorney, Agent, or Firm* — Haynes and Boone, LLP

(57) ABSTRACT

A support member includes a coupling piece that defines a support piece aperture extending through the coupling piece and that includes a coupling arm that extends from a location on the coupling piece that is spaced apart from the support piece aperture. The support member also includes a support piece that defines a coupling arm aperture, wherein the coupling arm is located in the coupling arm aperture. A support surface engagement member extends from the support piece and through the support piece aperture, wherein the support surface engagement member comprises an engagement surface and a stop member that extends from a surface on the support surface engagement member that is opposite from the engagement surface.

20 Claims, 12 Drawing Sheets

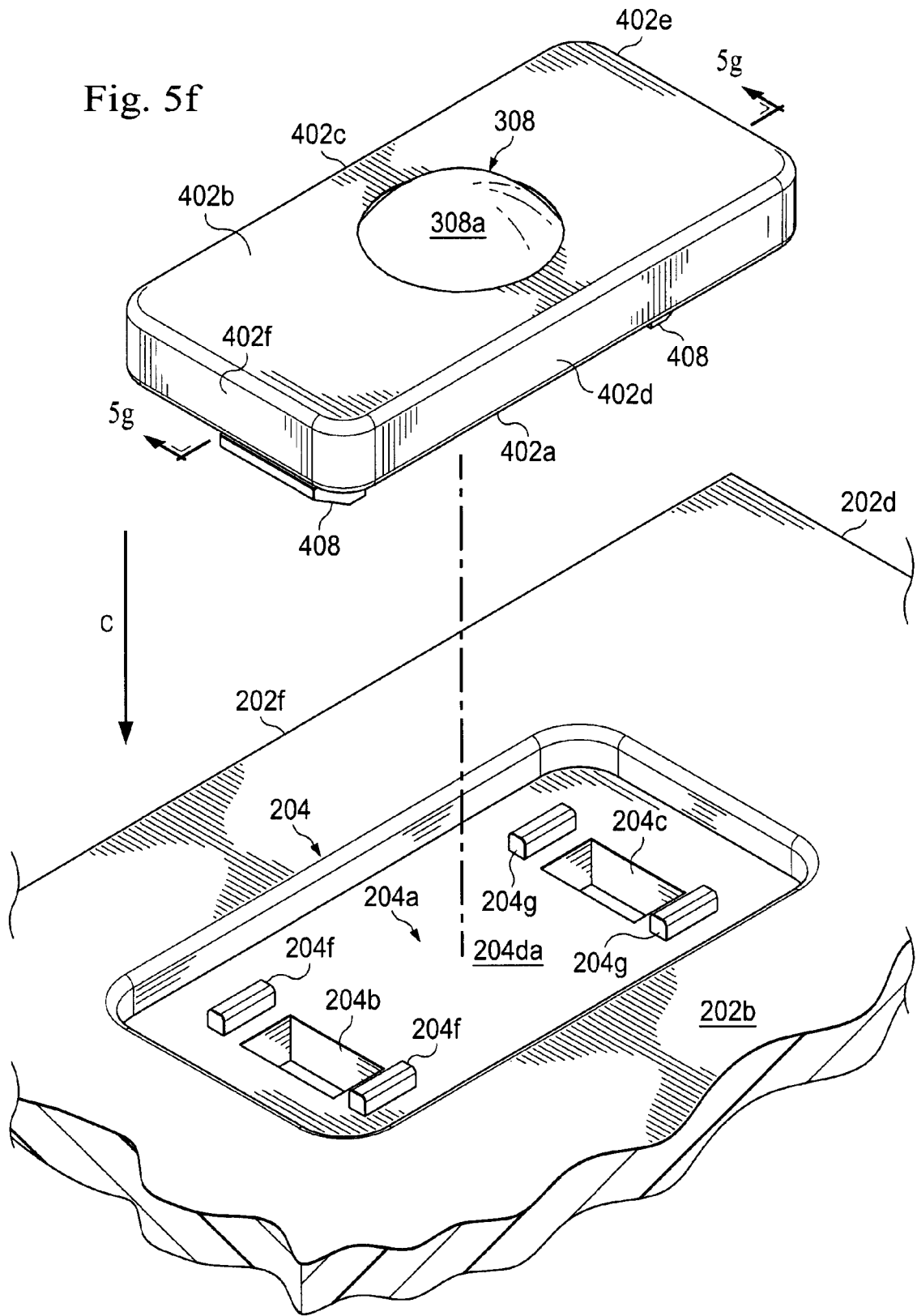

INFORMATION HANDLING SYSTEM SUPPORT MEMBER

BACKGROUND

The present disclosure relates generally to information handling systems, and more particularly to a support member for supporting an information handling system chassis.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs typically include an IHS chassis that is commonly placed on a support surface when the IHS is being used. It is desirable for the IHS chassis to sit level with the support surface and not rock and/or wobble when a force is applied to the IHS chassis. Preventing the rocking and/or wobbling of the IHS chassis raises a number of issues.

Conventionally, these issues are solved by providing support members or 'feet' that extend from the bottom surface of the IHS chassis to engage the support surface in order to, for example, prevent the bottom surface of the IHS chassis from engaging the support surface. One solution includes relatively hard, solid support members fabricated from, for example, plastic, metal, or other similar materials. However, such a solution requires careful control of the distortion tolerances in the IHS chassis that may be introduced during and/or after manufacture of the IHS (e.g., due to assembly deviations, part bending, weight deviations, etc.) to ensure that the rocking and/or wobble phenomenon is avoided, and thus can raise costs of manufacturing the IHS. Another solution includes relatively soft solid support members fabricated from, for example, rubber or other similar material. However, the distortion tolerances discussed above can still result in the rocking and/or wobble phenomenon by preventing all of the support members from engaging the support surface simultaneously.

Accordingly, it would be desirable to provide an improved support member for an IHS chassis.

SUMMARY

According to one embodiment, a support member includes a coupling piece that defines a support piece aperture extending through the coupling piece and that comprises a coupling arm that extends from a location on the coupling piece that is spaced apart from the support piece aperture, a support piece that defines a coupling arm aperture, wherein the coupling arm is located in the coupling arm aperture, and a support surface engagement member that extends from the support piece and through the support piece aperture, wherein the support surface engagement member comprises an engagement surface and a stop member that extends from a surface on the support surface engagement member that is opposite from the engagement surface.

BRIEF DESCRIPTION OF THE DRAWINGS

FIG. 2b is a perspective view illustrating an embodiment of a support member coupling on the chassis of FIG. 2a.

FIG. 3b is a cross-sectional view illustrating an embodiment of the support piece of FIG. 3a.

FIG. 4b is a cross-sectional view illustrating an embodiment of the coupling piece of FIG. 4a.

FIG. 5f is a perspective view illustrating an embodiment of the support piece and coupling piece of FIGS. 5c, 5d and 5e being coupled to the chassis of FIGS. 2a, 2b and 2c.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
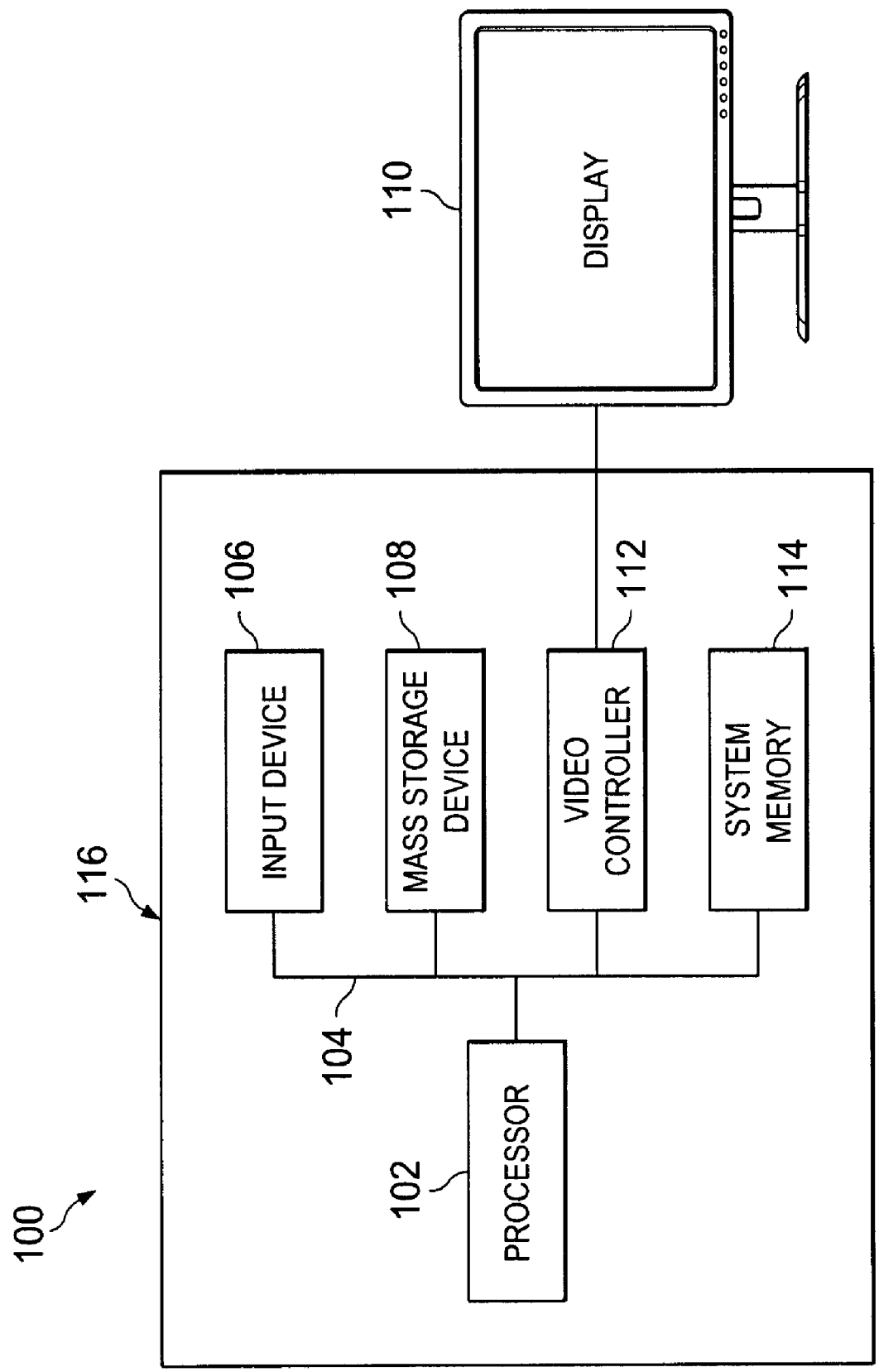
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
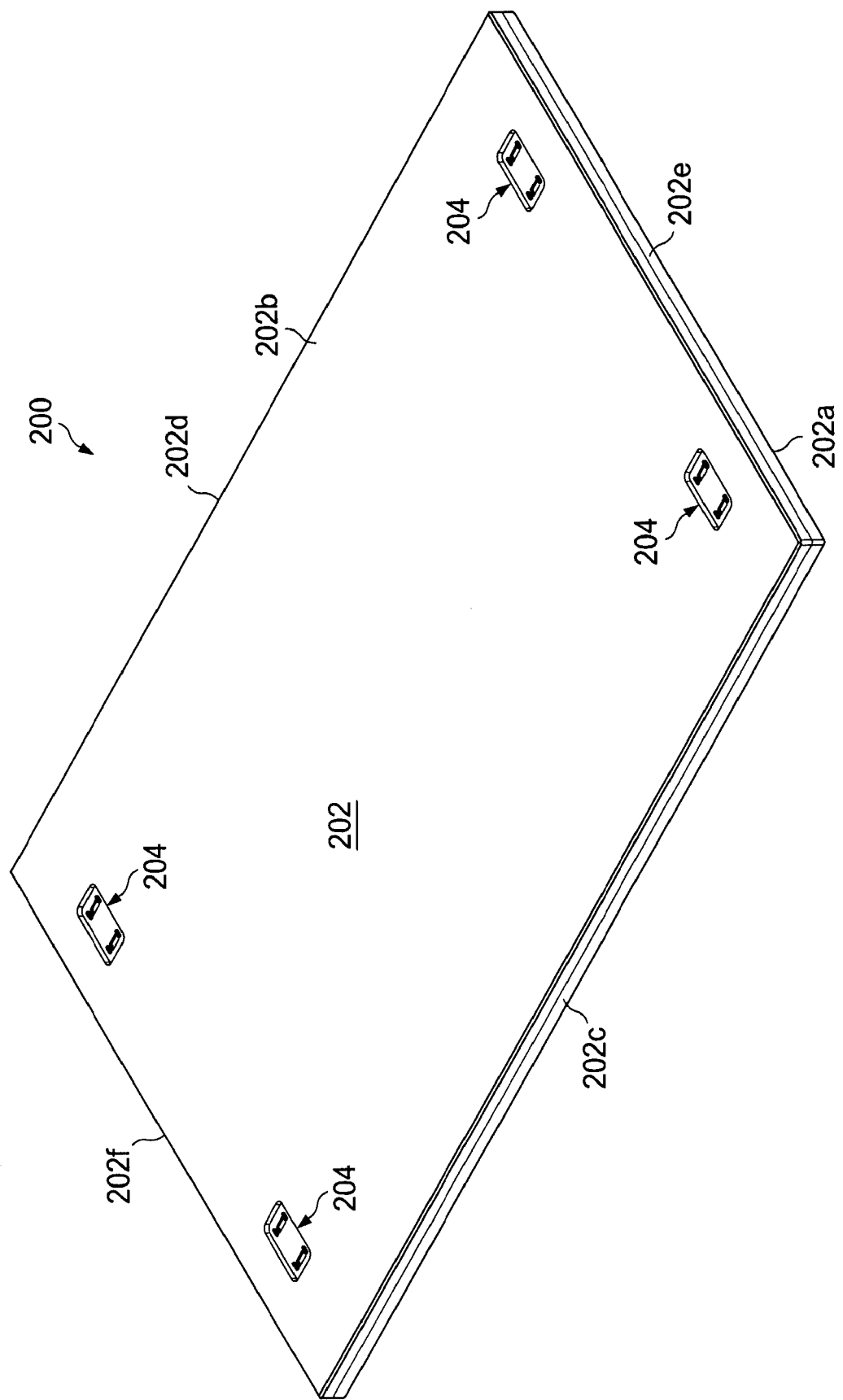
FIG. 2a is a bottom perspective view illustrating an embodiment of a chassis.
Figure 2B:
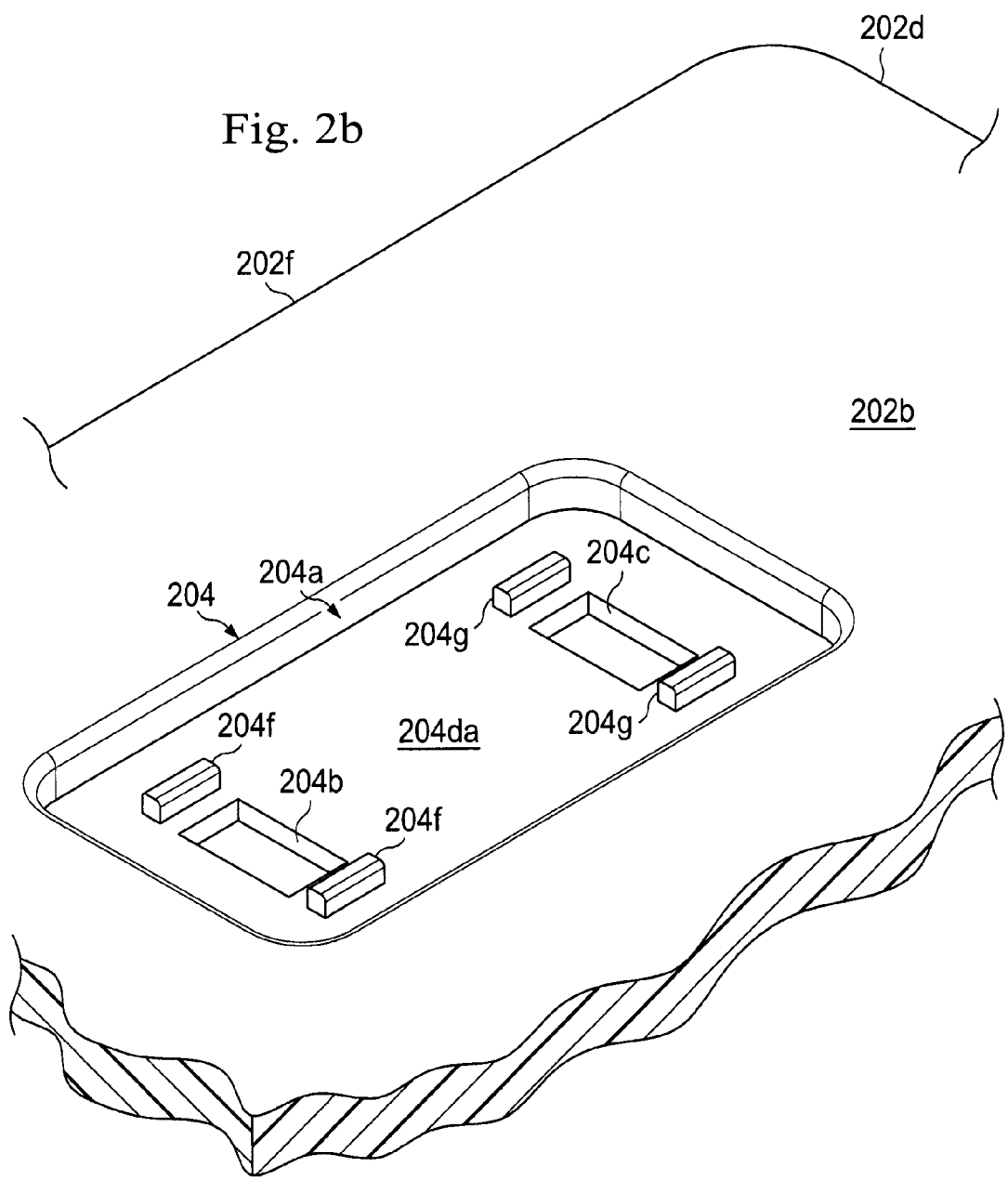
Figure 2C:
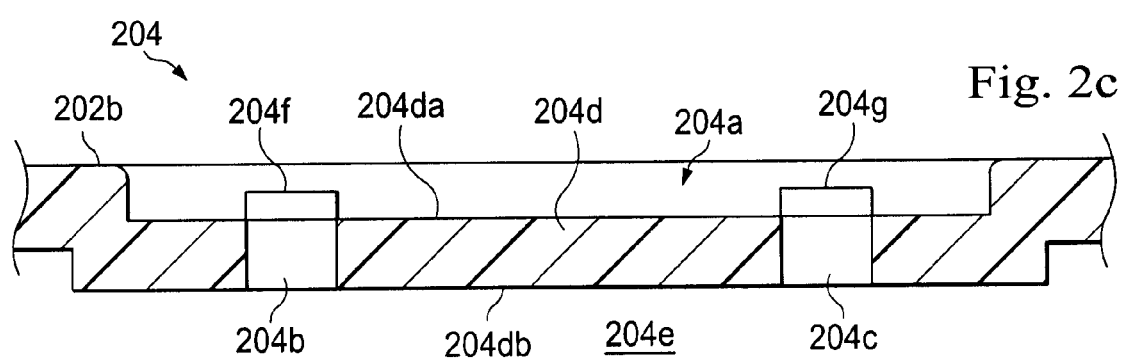
FIG. 2c is a cross-sectional view illustrating an embodiment of the support member coupling of FIG. 2b.

Referring now to FIGS. 2a and 2b, an IHS chassis 200 is illustrated. In an embodiment, the IHS chassis 200 may be the chassis 116, described above with reference to FIG. 1. The IHS chassis 200 includes a base 202 having a top surface 202a, a bottom surface 202b located opposite the top surface 202a, a front surface 202c extending between the top surface 202a and the bottom surface 202b, a rear surface 202d located opposite the front surface 202c and extending between the top surface 202a and the bottom surface 202b, and a pair of opposing side surfaces 202e and 202f extending between the top surface 202a, the bottom surface 202b, the front surface 202c, and the rear surface 202d. A plurality of support member couplings 204 are located on the bottom surface 202b of the base 202 in a spaced apart relationship (e.g., at each corner of the bottom surface 202b in the illustrated embodiment). Each support member coupling 204 includes a support member channel 204a defined by the base 202 and extending into the base 202 from the bottom surface 202b. A pair of coupling apertures 204b and 204c extend from the support member channel 204a, through a wall 204d of the base 202 that includes a first surface 204da adjacent the support member channel 204a and a second surface 204db located opposite the first surface 204da, and to a housing portion 204e of the IHS chassis 200. A pair of pegs 204f extend from the first surface 204da of the wall 204d in the support member channel 204a on opposite sides of the coupling aperture 204b, and a pair of pegs 204g extend from the first surface 204da of the wall 204d in the support member channel 204a on opposite sides of the coupling aperture 204c.

Figure 3A:
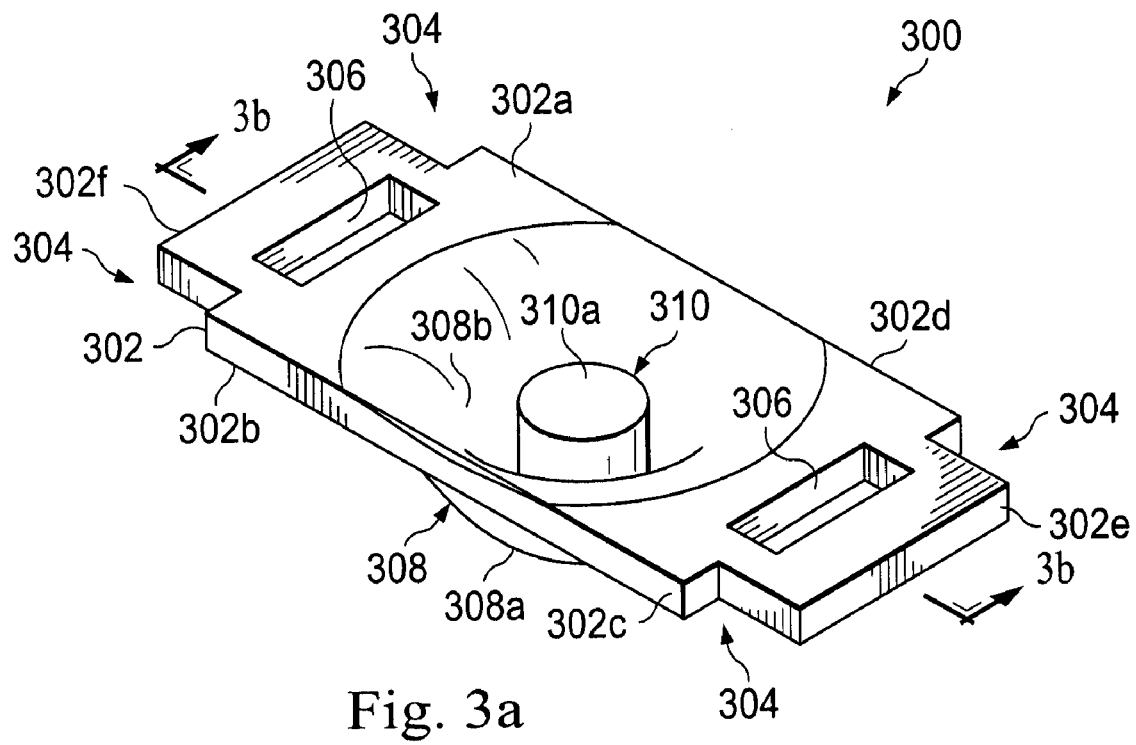
FIG. 3a is a perspective view illustrating an embodiment of a support piece used with the chassis of FIGS. 2a, 2b and 2c.
Figure 3B:
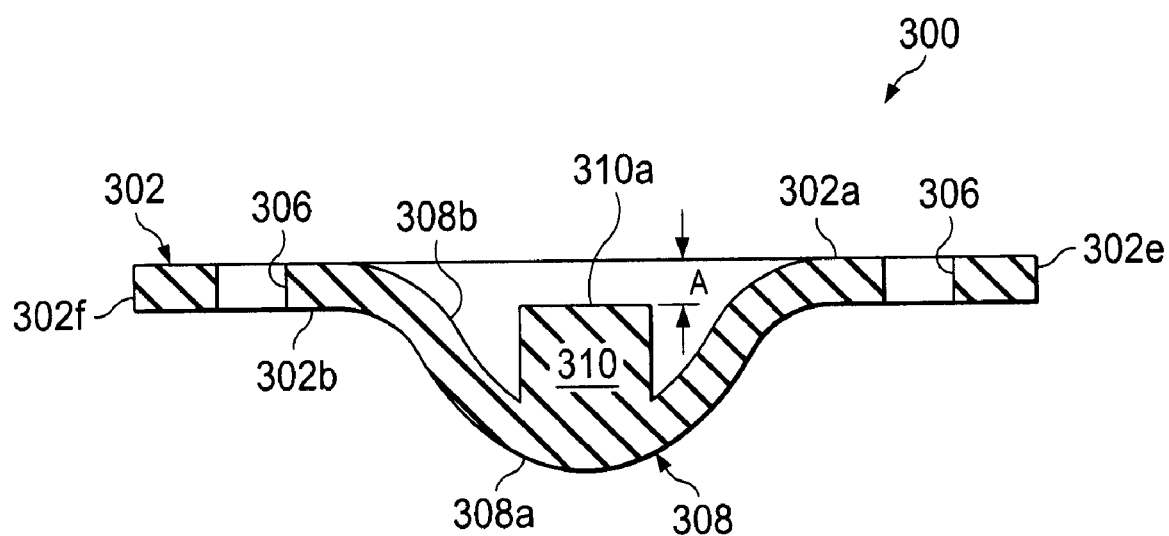

Referring now to FIGS. 3a and 3b, a support piece 300 is illustrated. The support piece 300 includes a base 302 having a top surface 302a, a bottom surface 302b located opposite the top surface 302a, a front edge 302c extending between the top surface 302a and the bottom surface 302b, a rear edge 302d located opposite the front edge 302c and extending between the top surface 302a and the bottom surface 302b, and a pair of opposing side edges 302e and 302f extending between the top surface 302a, the bottom surface 302b, the front edge 302c, and the rear edge 302d. A plurality of support piece channels 304 are defined by the base 302 and located about the perimeter of the base 302 in a spaced apart relationship (e.g., at each corner of the base 302 in the illustrated embodiment). A pair of coupling arm apertures 306 are defined by the base 302, extend through the base 302 from the top surface 302a to the bottom surface 302b, and are located at opposite sides of the base 302 (e.g., adjacent the side edges 302e and 302f in the illustrated embodiment). A support surface engagement member 308 extends from a location on the bottom surface 302b of the base 302 between the coupling arm apertures 306. In the illustrated embodiment, the support surface engagement member 308 is a hemispherical member. However, one of skill in the art will recognize that the support surface engagement member 308 may include a variety of other shapes known in the art without departing from the scope of the present disclosure. The support surface engagement member 308 includes a engagement surface 308a that, around the perimeter of the support surface engagement member 308, is located adjacent the bottom surface 302b of the base 302. The support surface engagement member 308 also includes an inner surface 308b that is located opposite the engagement surface 308a and that, around the perimeter of the support surface engagement member 308, is located adjacent the top surface 302a of the base 302. A stop member 310 extends from the inner surface 308b of the support surface engagement member 308 and includes a distal end 310a that is spaced apart by a distance A from an imaginary plane that would intersect the top surface 302a of the base 302 A. In an embodiment, the support piece 300 is fabricated from a soft, resilient material such as, for example, a rubber material.

Figure 4A:
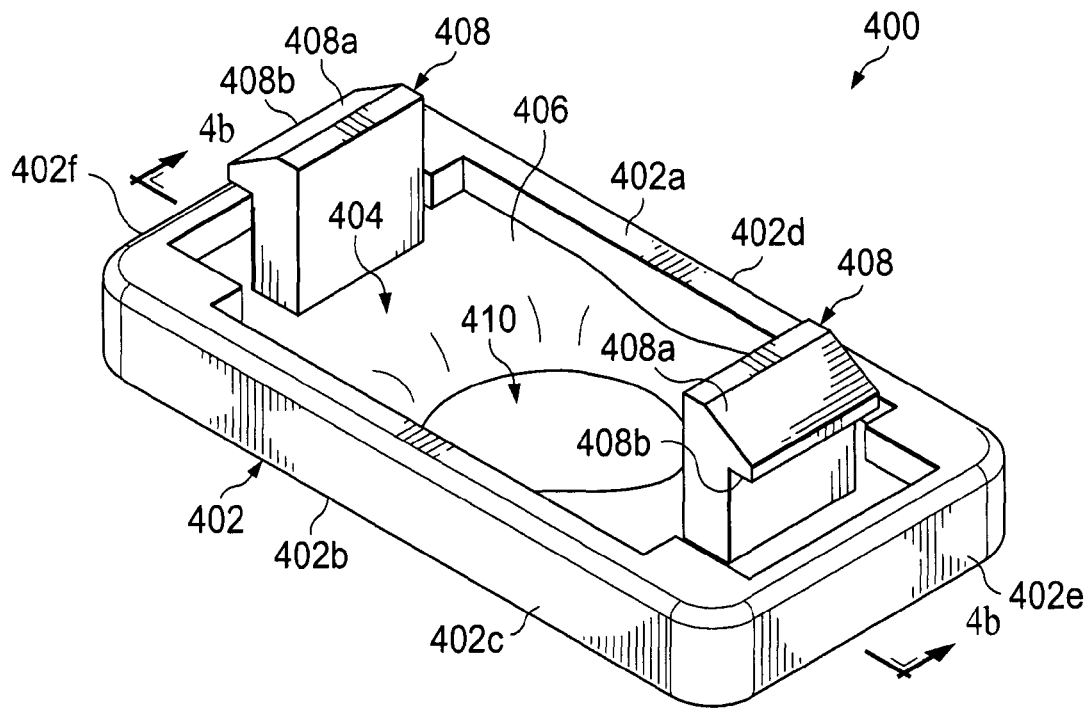
FIG. 4a is a perspective view illustrating an embodiment of a coupling piece used with the chassis of FIGS. 2a, 2b and 2c and the support piece of FIGS. 3a and 3b.
Figure 4B:
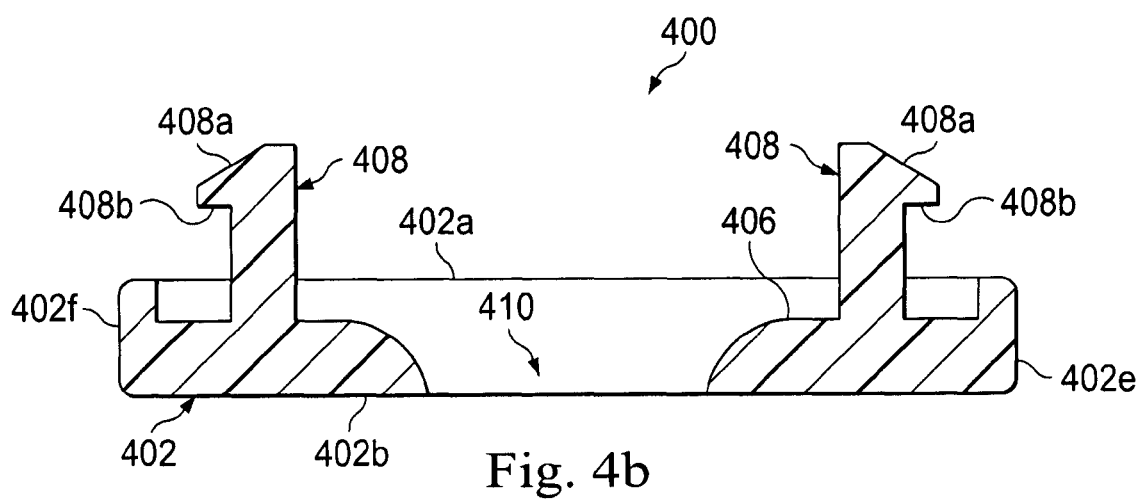

Referring now to FIGS. 4a and 4b, a coupling piece 400 is illustrated. The coupling piece 400 includes a base 402 having a top surface 402a, a bottom surface 402b located opposite the top surface 402a, a front edge 402c extending between the top surface 402a and the bottom surface 402b, a rear edge 402d located opposite the front edge 402c and extending between the top surface 402a and the bottom surface 402b, and a pair of opposing side edges 402e and 402f extending between the top surface 402a, the bottom surface 402b, the front edge 402c, and the rear edge 402d. A support piece housing 404 is defined by the base 402 and extends into the base 402 from the top surface 402a to a support piece coupling surface 406. A pair of coupling arms 408 extend from the support piece coupling surface 406 and are located at opposite sides of the base 402 (e.g., adjacent the side edges 402e and 402f in the illustrated embodiment). Each coupling arm 408 includes a beveled surface 408a and a securing surface 408b. A support piece aperture 410 is defined by the base 402, extends through the base 402 from the support piece coupling surface 406 to the bottom surface 402b, and is located on the base 402 between the coupling arms 408. In an embodiment, the coupling piece 400 is fabricated from a hard material such as, for example, a metal or plastic material (e.g., a material that is harder relative to the material from which the support member 300 is fabricated).

Figure 5A:
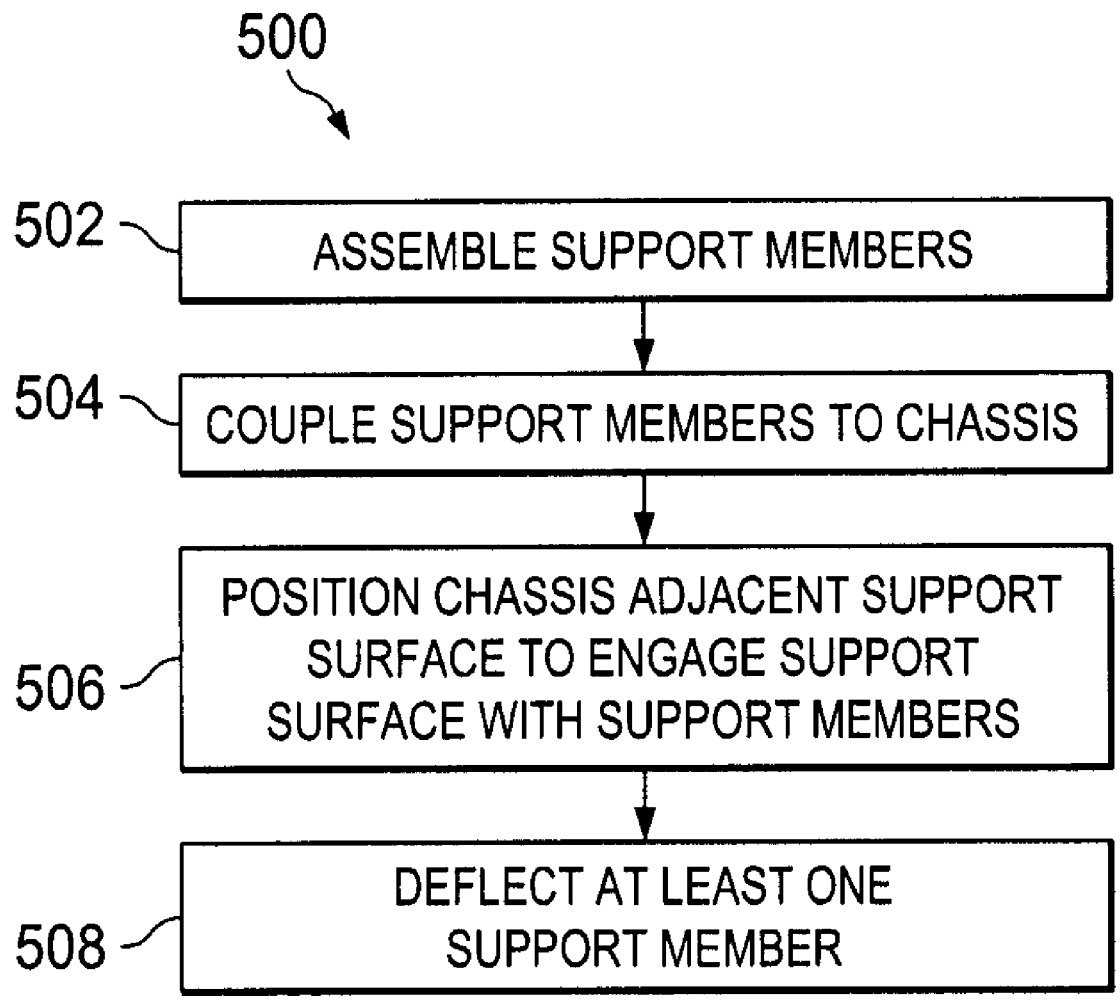
FIG. 5a is a flow chart illustrating an embodiment of a method for supporting a chassis.
Figure 5B:
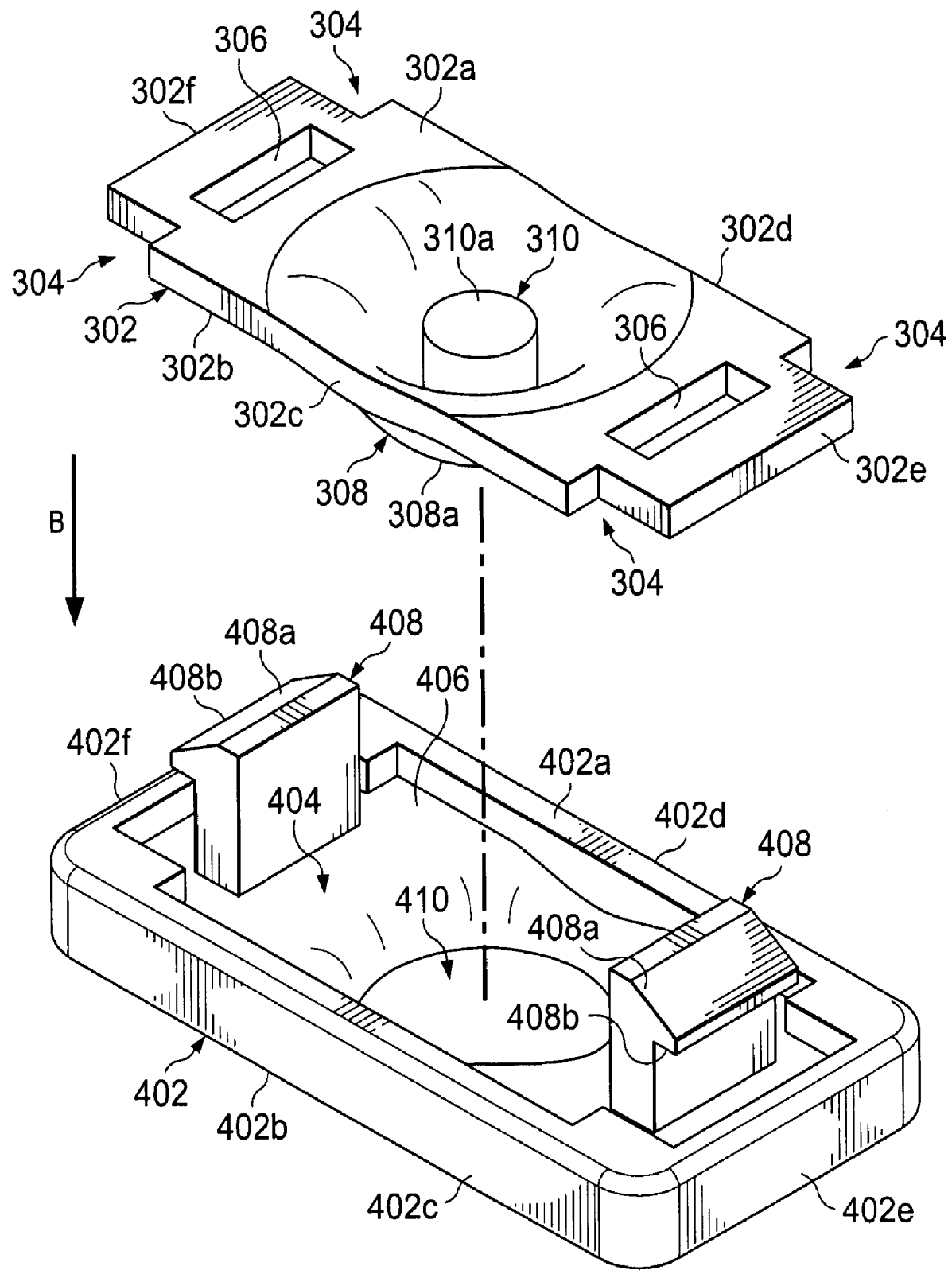
FIG. 5b is a perspective view illustrating an embodiment of the support piece of FIGS. 3a and 3b being coupled to the coupling piece of FIGS. 4a and 4b.
Figure 5C:
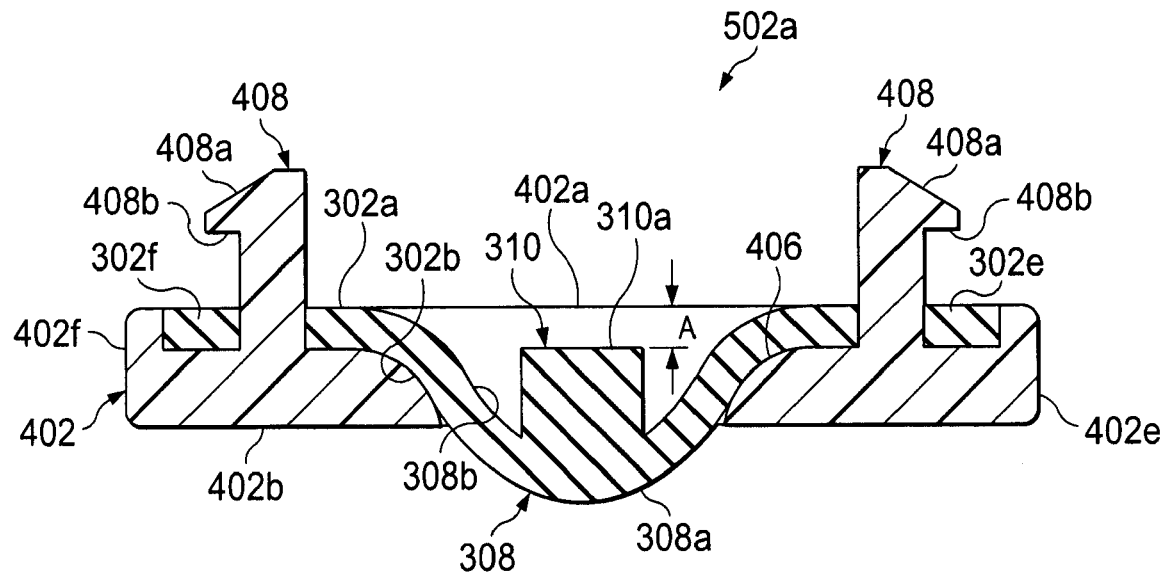
FIG. 5c is a cross-sectional view illustrating an embodiment of the support piece of FIGS. 3a and 3b coupled to the coupling piece of FIGS. 4a and 4b.
Figure 5D:
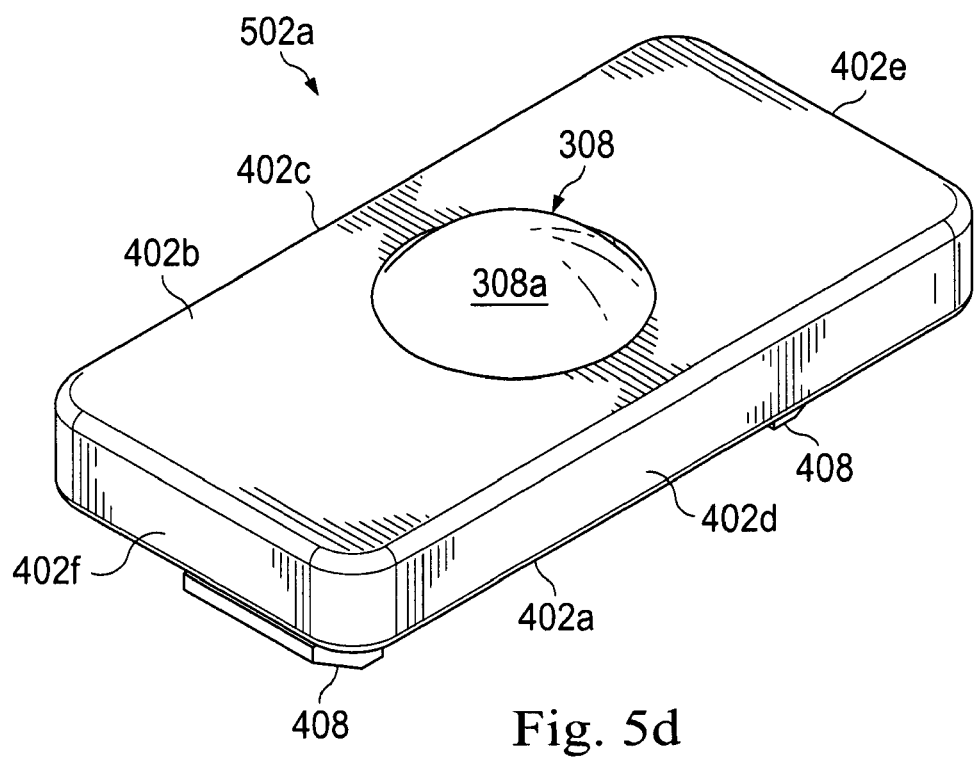
FIG. 5d is a top perspective view illustrating an embodiment of the support piece of FIGS. 3a and 3b coupled to the coupling piece of FIGS. 4a and 4b.
Figure 5E:
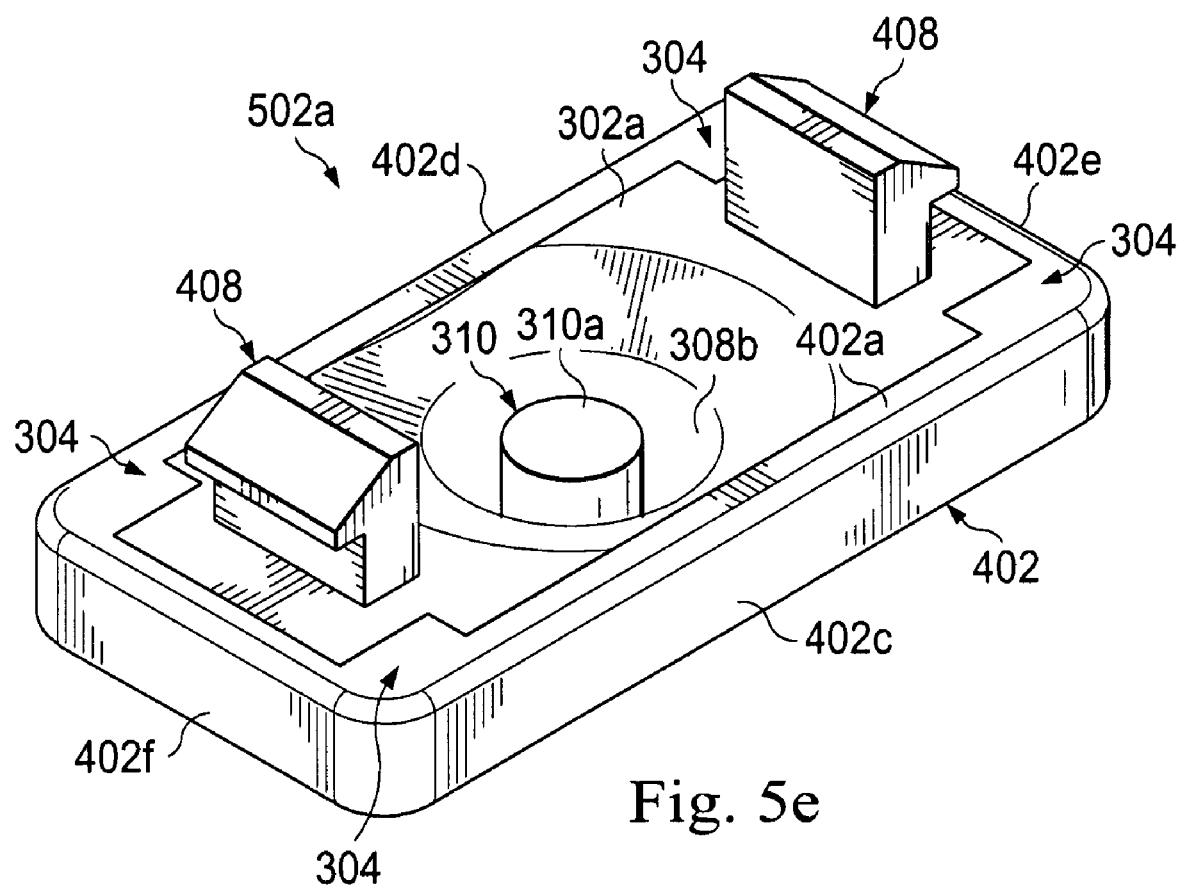
FIG. 5e is a bottom perspective view illustrating an embodiment of the support piece of FIGS. 3a and 3b coupled to the coupling piece of FIGS. 4a and 4b.

Referring now to FIGS. 5a, 5b, 5c, 5d and 5e, a method 500 for supporting a chassis is illustrated. The method 500 begins at block 502 where at least one support member is assembled. The support piece 300, described above with reference to FIGS. 3a and 3b, is positioned adjacent the coupling piece 400, described above with reference to FIGS. 4a and 4b, such that the bottom surface 302b of the support piece 300 is located adjacent the top surface 402a of the coupling piece 400, with the support piece 300 substantially aligned with the support piece housing 404 such that the coupling arm apertures 306 are aligned with the coupling arms 408 and the support surface engagement member 308 is aligned with the support piece aperture 410, as illustrated in FIG. 5b. The support piece 300 is then moved relative to the coupling piece 400 in a direction B such that the coupling arms 408 become located in the coupling arm apertures 306, the bottom surface 302b of the support piece 300 engages the support piece coupling surface 406 of the coupling piece 400, and the support surface engagement member 308 extends through the support piece aperture 410, as illustrated in FIGS. 5c and 5d. In an embodiment, as discussed above, the support piece 300 may be fabricated from a relatively resilient material and the coupling piece 400 may be fabricated from a relatively hard material such that the portion of the base 302 of the support piece 300 that surrounds the coupling arm apertures 306 stretches to fit around the distal end of the coupling arms 408 when the support piece 300 is moved relative to the coupling piece 400 in the direction B, as described above. In this embodiment, the securing surface 408b on the coupling arms 408 operates to secure the support piece 300 to the coupling piece 400 by resisting the removal of the coupling arms 408 from the coupling arm apertures 306. With the support piece 300 secured to the coupling piece 400, the channels 304 are further defined between the support piece 300 and the coupling piece 400, as illustrated in FIG. 5e. With the support piece 300 secured to the coupling piece 400, a support member 502a is provided. The assembly process for the support member 502a described above is lower in cost relative to conventional double injection methods known in the art. In an embodiment, the support piece 300 and the coupling piece may be different colors.

Figure 5G:
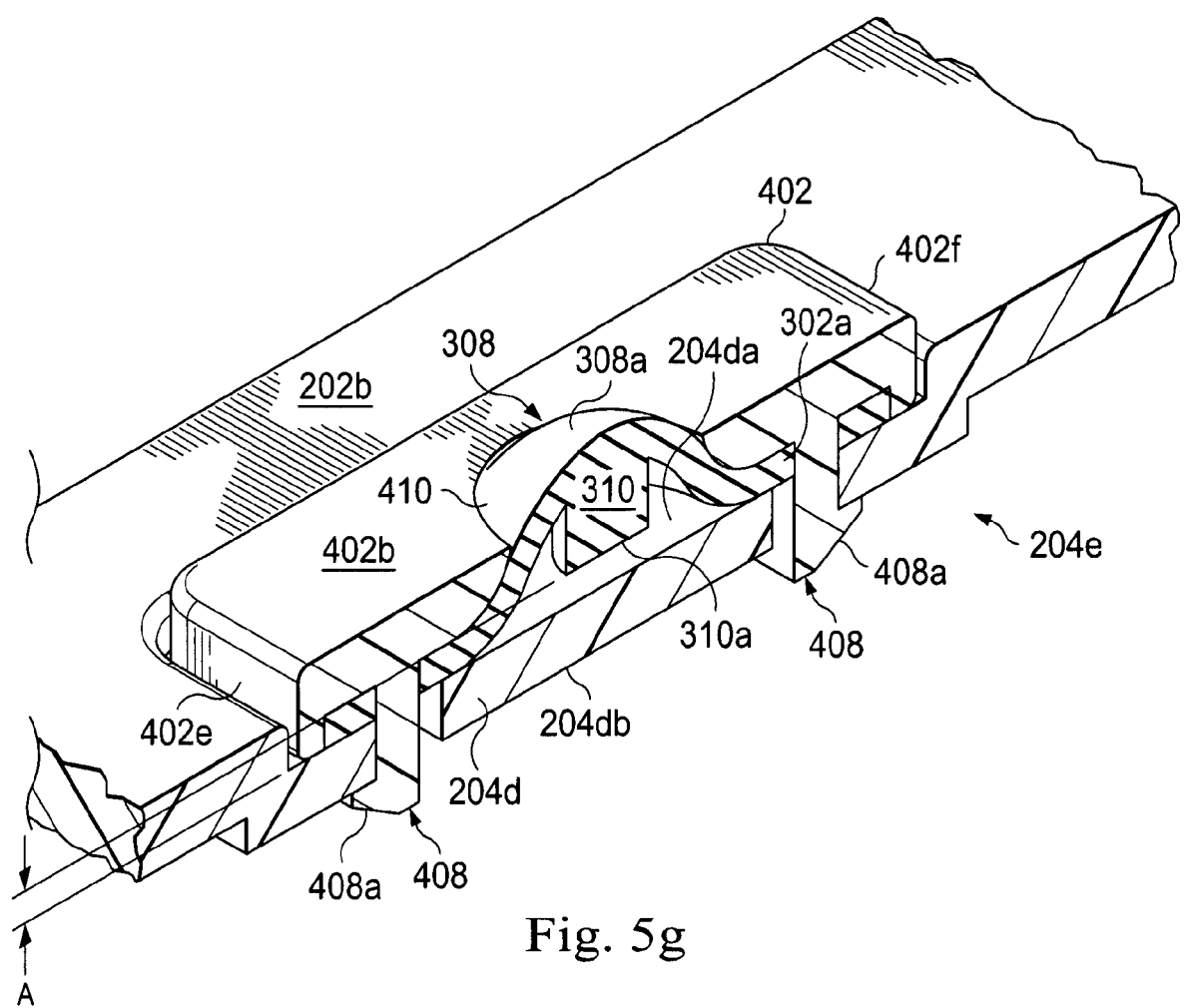
FIG. 5g is a cut-away perspective view illustrating an embodiment of the support piece and coupling piece of FIGS. 5c, 5d and 5e coupled to the chassis of FIGS. 2a, 2b and 2c.

Referring now to FIGS. 5f and 5g, the method 500 proceeds to block 504 where support members are coupled to the chassis. The support member 502a is positioned adjacent the bottom surface 202b of the chassis 200 such that the support member 502a is located adjacent the support member coupling 204, with the coupling arms 408 substantially aligned with the coupling apertures 204b and 204c, as illustrated in FIG. 5f. The support member 502a is then moved in a direction C in order to move the coupling arms 408 through the coupling apertures 204b and 204c such that the beveled surface 408a on each coupling arm 408 engages the first surface 204da of the wall 204d and causes the coupling arms 408 to flex towards each other until the coupling arms 408 move through the coupling apertures 204b and 204c and return to their un-flexed position, with the securing surface 408b engaging the second surface 204db of the wall 204d, as illustrated in FIG. 5g. As the support member 502a is coupled to the chassis 200, the pegs 204f and 204g become positioned in the channels 304 and operate to impede movement of the support member 502a relative to the chassis 200. With the coupling arms 408 located in the coupling apertures 204b and 204c as described above, the support member 502a is secured to the chassis 200. Other support members 502a may be coupled to the chassis 200 is substantially the same manner as described above. The coupling process described above for the support member 502a and the chassis 200 is lower in cost relative to conventional heat staking methods known in the art, and does not suffer from the peel-off issues that heat staked support members are known to experience. With the support member 502 secured to the chassis 200, the distal end 310a of the stop member 310 is located the distance A from the first surface 204da of the wall 204d, as illustrated in FIG. 5g. In an embodiment, the distance A between the distal end 310a of the stop member 310 and the first surface 204da of the wall 204d may be increased or decreased (rather than equaling the distance A between the distal end 310a of the stop member 310 and an imaginary plane that would intersects the top surface 302a of the base 302 (described above with reference to FIG. 3b)) by adjusting the relative positions of the wall 204d and the stop member 310 on the support member 502a.

Figure 5H:
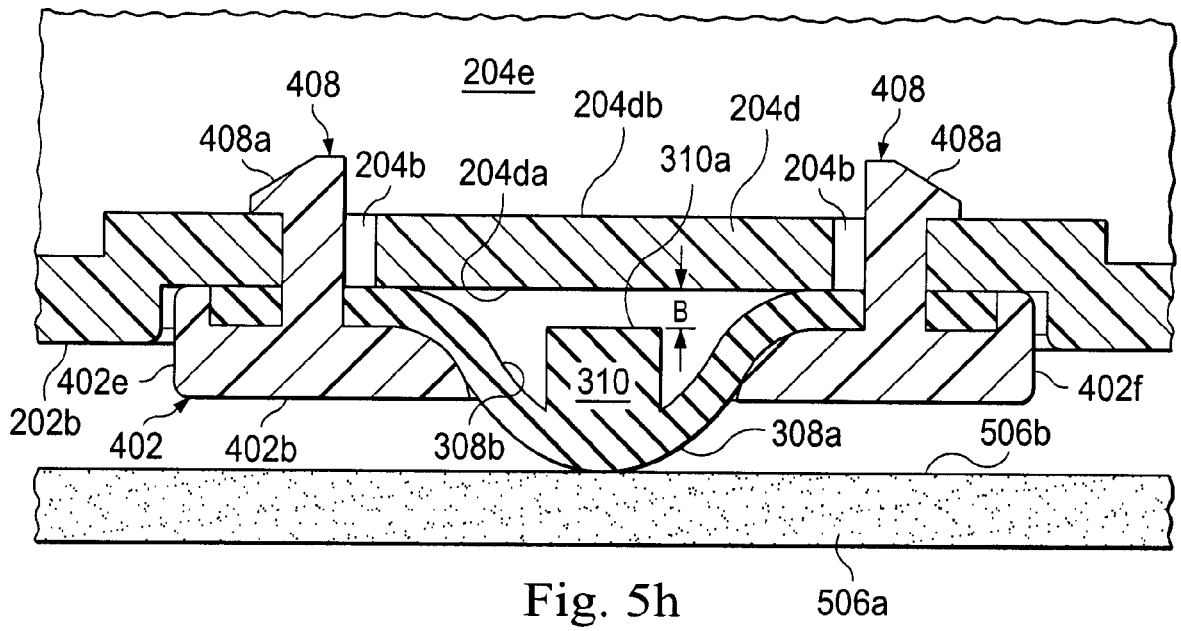
FIG. 5h is a cross-sectional view illustrating an embodiment of the support piece, coupling piece, and chassis of FIG. 5g positioned on a support surface.
Figure 5I:
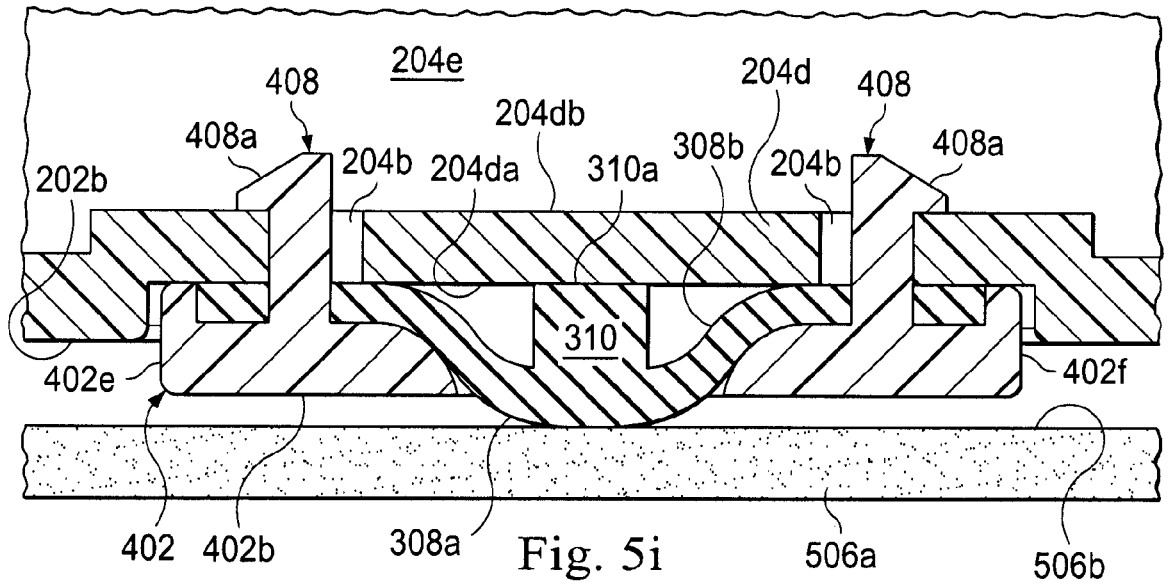
FIG. 5i is a cross-sectional view illustrating an embodiment of the support piece, coupling piece, and chassis of FIG. 5g positioned on a support surface.

Referring now to FIG. 5h and 5i, the method 500 then proceeds to block 506 where the chassis is positioned adjacent the support surface to engage the support surface with the support members. A support 506a is provided that includes a support surface 506b. The chassis 200 including a plurality of support members 502a secured to the chassis 200 is positioned adjacent the support surface 506b such that the bottom surface 202b of the chassis 200 is facing the support surface 506b. The chassis 200 is then brought towards the support surface 506b such that the engagement surface 308a on each of the support surface engagement members 308 engages the support surface 506b, as illustrated in FIG. 5h. The method 500 then proceeds to block 508 where at least one support member is deflected. With the chassis 200 positioned on the support surface 506b, a force may be created between the support surface 506b and the support surface engagement members 308 due to, for example, the weight of the chassis 200, a force applied to the chassis 200 by a user, and/or through a variety of other force providing methods known in the art. In an embodiment, the force created between the support surface 506b and the support engagement members 308 causes the support surface engagement members 308 to deflect such that the distal end 310a of the stop member 310 moves relative to the first surface 204da of the wall 204d to decrease the distance between them to a distance B that is less than the distance A discussed above. In an embodiment, the force created between the support surface 506b and the support surface engagement members 308 causes the support surface engagement members 308 to deflect such that the distal end 310a of the stop member 310 moves relative to the first surface 204da of the wall 204d until the distal end 310 engages the first surface 204da and substantially prevents the support surface engagement member 308 from deflecting any further, as illustrated in FIG. 5i. The shape of the support surface engagement members 300 and/or the material from which the support surface engagement members 308 are fabricated from may be selected to produce a predetermined deflection of the support surface engagement members 308 upon application of a predetermined force created between the support surface 506b and the support surface engagement members 308. By providing for the predetermined deflection of the support surface engagement members 308 for a chassis (e.g., by knowing a chassis weight, chassis distortion tolerances, the forces the chassis is likely to experience, etc.), each of the support surface engagement members 308 will engage the support surface 506b when the chassis is positioned on the support surface 506b due to the variable deflection provided by each of the support surface engagement members 308 as described above. By providing that all of the support surface engagements members 308 are engaged with the support surface 506b, wobbling and/or rocking of the chassis is remedied. Thus, a support member has been described that is easy and inexpensive to manufacture and that, when a plurality of the support members are coupled to a chassis, prevent rocking and/or wobbling of the chassis when the chassis is positioned on a support surface.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A support member, comprising:
   a coupling piece that defines a support piece aperture extending through the coupling piece and that comprises a coupling arm that extends from a location on the coupling piece that is spaced apart from the support piece aperture and into engagement with a chassis to couple the coupling piece to the chassis, wherein the coupling piece is fabricated from a material having a first hardness;
   a support piece that defines a coupling arm aperture and is fabricated from a material having a second hardness that is less than the first hardness, wherein the coupling arm is located in the coupling arm aperture; and
   a support surface engagement member that extends from the support piece and through the support piece aperture, wherein the support surface engagement member comprises an engagement surface and a stop member that extends from a surface on the support surface engagement member that is opposite from the engagement surface.

2. The support member of claim 1, wherein the coupling arm comprises a first coupling arm, and wherein the coupling piece further comprises a second coupling arm that extends from a location on the coupling piece that is spaced apart from the support piece aperture and into engagement with a chassis to couple the coupling piece to the chassis, wherein the second coupling arm is located opposite the support piece aperture from the first coupling arm.

3. The support member of claim 2, wherein the coupling arm aperture comprises a first coupling arm aperture in which the first coupling arm is located, and wherein the support piece also defines a second coupling arm aperture in which the second coupling arm is located.

4. The support member of claim 1, wherein the support surface engagement member is hemispherical.

5. The support member of claim 1, wherein the support piece comprises a first surface and a second surface located opposite the first surface, and wherein the support surface engagement member extends from the first surface, and the stop member extends from the support surface engagement member such that a distal end of the stop member is spaced apart by an empty volume from an imaginary plane that would intersect the second surface.

6. The support member of claim 1, wherein a channel is defined between the support piece and the coupling piece and the chassis comprises a peg, and wherein the peg and channel are operable to engage to impede movement of the support member relative to the chassis.

7. The support member of claim 1, wherein the material that the coupling piece is fabricated from is a plastic material.

8. The support member of claim 7, wherein the material that the support piece is fabricated from is a rubber material.

9. An information handling system (IHS), comprising:
   an IHS chassis comprising a plurality of support member couplings;
   a processor housed in the chassis;
   a memory coupled to the processor; and
   a support member coupled to each of the support member couplings; each support member comprising:
      a coupling piece that defines a support piece aperture extending through the coupling piece and that comprises a coupling arm that extends from a location on the coupling piece that is spaced apart from the support piece aperture and into engagement with the support member coupling to couple the coupling piece to the IHS chassis, wherein the coupling piece is fabricated from a material having a first hardness;
      a support piece that defines a coupling arm aperture and is fabricated from a material having a second hardness that is less than the first hardness, wherein the coupling arm is located in the coupling arm aperture; and
      a support surface engagement member that extends from the support piece and through the support piece aperture, wherein the support surface engagement member comprises an engagement surface and a stop member that extends from a surface on the support surface engagement member that is opposite from the engagement surface;
      wherein each of the support surface engagement members are fabricated to provide a variable deflection that is based at least partly on properties of the IHS chassis such that each support surface engagement member will engage a support surface when the IHS chassis is position adjacent the support surface.

10. The system of claim 9, wherein the coupling arm comprises a first coupling arm that engages the support member coupling, and wherein the coupling piece further comprises a second coupling arm that extends from a location on the coupling piece that is spaced apart from the support piece aperture and opposite the support piece aperture from the first coupling arm, and wherein the second coupling arm engages the support member coupling to couple the coupling piece to the IHS chassis.

11. The system of claim 10, wherein the coupling arm aperture comprises a first coupling arm aperture in which the first coupling arm is located, and wherein the support piece also defines a second coupling arm aperture in which the second coupling arm is located.

12. The system of claim 9, wherein the support surface engagement member is hemispherical.

13. The system of claim 9, wherein the support piece comprises a first surface and a second surface located opposite the first surface, and wherein the support surface engagement member extends from the first surface, and the stop member extends from the support surface engagement member such that a distal end of the stop member is spaced apart by an empty volume from an imaginary plane that would intersect the second surface.

14. The system of claim 9, wherein a channel is defined between the support piece and the coupling piece, and wherein each support member coupling comprises a peg that engages the channel to impede movement of the support member relative to the chassis.

15. The system of claim 9, wherein the material that the coupling piece is fabricated from is a plastic material.

16. The system of claim 15, wherein the material that the support piece is fabricated from is a rubber material.

17. The system of claim 9, further comprising:
   a support surface, wherein the IHS chassis is positioned adjacent the support surface such that the engagement surface on the support surface engagement members engage the support surface and at least one of the support surface engagement members deflect until the stop member engages a stop surface.

18. A method for supporting a chassis, comprising:
   providing a chassis comprising a plurality of support members, each support member comprising a support surface engagement member that is fabricated from a first material having a first hardness and that extends through a support piece aperture defined by a coupling piece that is fabricated from a second material having a second hardness and that is coupled to the chassis;

positioning the chassis adjacent a support surface, wherein each of the support surface engagement members are fabricated to provide a variable deflection that is based at least partly on properties of the IHS chassis such that each support surface engagement member engage the support surface; and deflecting at least one of the support surface engagement members such that a stop member that extends from the at least one support surface engagement member engages a stop surface to prevent further deflection of the at least one support surface engagement member.

19. The method of claim 18, further comprising:

coupling each support member to the chassis, wherein the coupling comprises:

positioning a coupling arm that extends from the coupling piece in a coupling arm aperture defined by the support piece;

extending the support surface engagement member through the support piece aperture; and engaging the coupling arm with the chassis to secure the coupling piece and the support piece to the chassis.

20. The method of claim 19, wherein the coupling each support member to the chassis further comprises:

positioning a peg that extends from the chassis in a channel defined between the support piece and the coupling piece in order to impede movement of the support member relative to the chassis.

* * * * *